United States Patent [19]

McCormick

[11] Patent Number: 4,583,628
[45] Date of Patent: Apr. 22, 1986

[54] MARINE DRIVE EXPANDING CLUTCH

[75] Inventor: Daniel F. McCormick, Oshkosh, Wis.

[73] Assignee: Brunswick Corp., Skokie, Ill.

[21] Appl. No.: 566,491

[22] Filed: Dec. 29, 1983

[51] Int. Cl.$^4$ .............................................. F16D 13/14
[52] U.S. Cl. ...................................... 192/76; 192/96;
74/366; 440/86
[58] Field of Search ...................... 74/355, 361, 366;
192/71, 75, 76, 78, 96; 440/74, 75, 84, 86

[56] References Cited

U.S. PATENT DOCUMENTS

| | | | |
|---|---|---|---|
| 1,596,192 | 8/1926 | Knapp | 74/372 |
| 2,630,775 | 3/1953 | Kiekhaefer | 115/17 |
| 2,728,320 | 12/1955 | Kloss | 192/96 X |
| 2,959,986 | 11/1960 | Irgens et al. | 74/792 |
| 3,503,360 | 3/1970 | Hoff | 192/96 X |
| 3,608,684 | 9/1971 | Shimanckas | 192/20 |
| 3,931,783 | 1/1976 | Croisant | 115/34 R |
| 4,223,773 | 9/1980 | Croisant et al. | 192/48.91 |
| 4,258,642 | 3/1981 | Burmeister | 440/53 |
| 4,302,196 | 11/1981 | Blanchard | 440/75 |
| 4,323,356 | 4/1982 | Stephenson | 440/86 |
| 4,395,240 | 7/1983 | Blanchard | 440/86 |

FOREIGN PATENT DOCUMENTS

| | | |
|---|---|---|
| 497635 | 12/1919 | France . |
| 1061817 | 4/1954 | France . |
| 1334551 | 7/1963 | France . |
| 146930 | 5/1931 | Switzerland . |

OTHER PUBLICATIONS

"Helicopter Freewheel Unit Design Guide", Sikorsky Aircraft, Div. of United Technologies Corp., N. Main St., Stratford, Conn., U.S. Army Air Mobility Research and Development Laboratories, Fort Eustis, Va., USAAMRDL-TR-77-18, Oct. 1977, pp. 14, 16, 56.
"OMC Marine Drive Systems", Outboard Marine Corp., Waukegan, Illinois, 1981, pp. 6-7.

Primary Examiner—Stephen F. Husar
Attorney, Agent, or Firm—Andrus, Sceales, Starke & Sawall

[57] ABSTRACT

Clutch apparatus (2) for a marine drive lower gear case (4) includes a wrapped spring clutch (18) mounted to a propeller shaft (6) for engaging drive gear means (8) for driving the propeller shaft. The clutch is radially expandable to engage the drive gears along an axially extending friction face engagement surface.

13 Claims, 1 Drawing Figure

MARINE DRIVE EXPANDING CLUTCH

DESCRIPTION

1. Technical Field

The invention relates to clutch apparatus for a marine drive lower gear case.

2. Background

In Croisant et al. U.S. Pat. No. 4,223,773 and Croisant U.S. Pat. No. 3,931,783, a toothed clutch gear is movable axially along a propeller shaft into engagement with forward and reverse drive gears, for driving the propeller shaft.

DISCLOSURE OF THE INVENTION

A clutch is provided which is movable to engage a drive gear along a friction face engagement surface which extends axially. A wrapped spring clutch is radially expandable outwardly into engagement with a concentric drive gear.

BEST MODE FOR CARRYING OUT THE INVENTION

Figure 1:
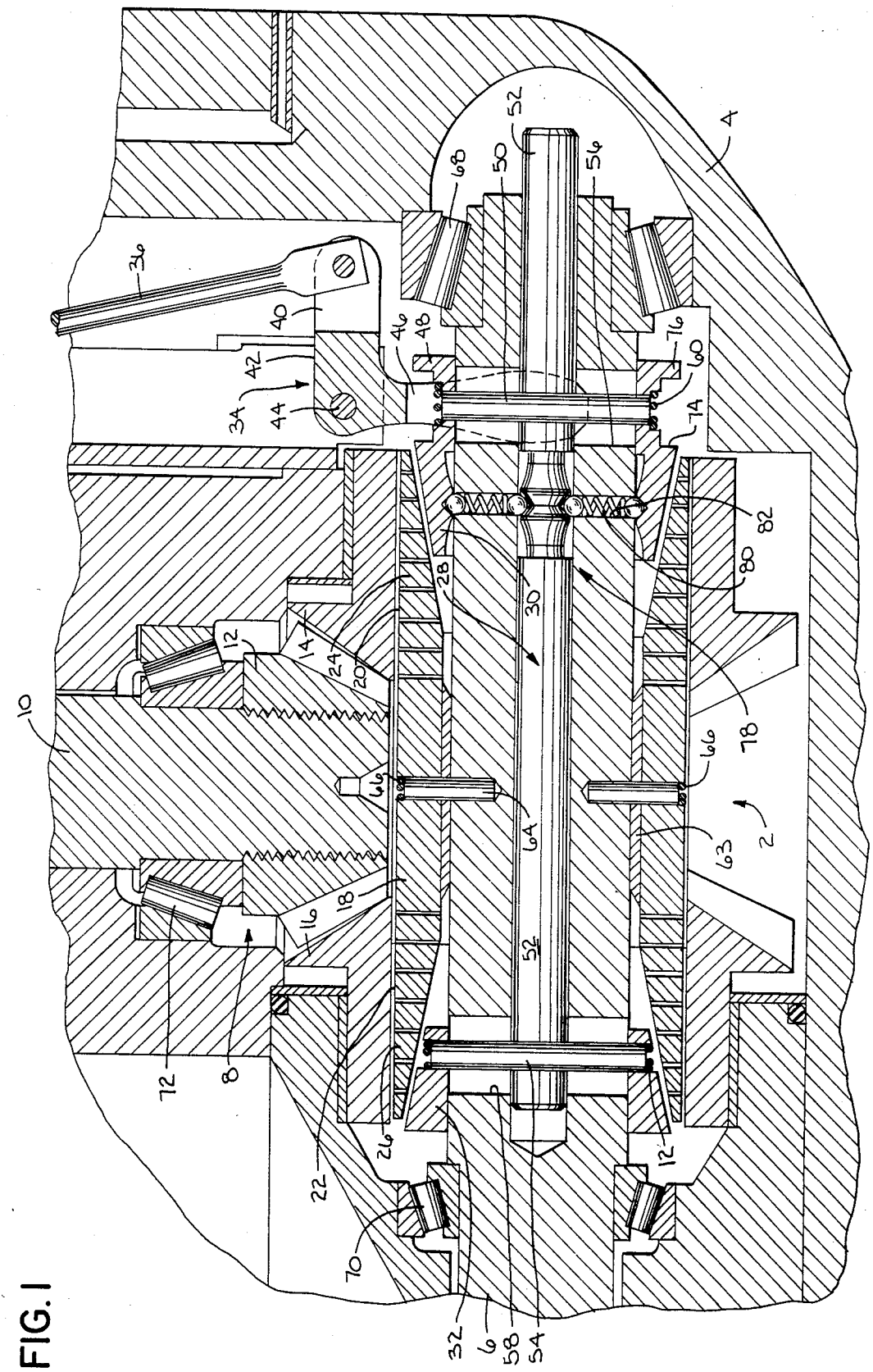
FIG. 1 is a partial sectional view of clutch apparatus for a marine drive lower gear case constructed in accordance with the invention.

Clutch apparatus 2 for a marine drive lower gear case 4 includes a propeller shaft 6 rotatably mounted in the gear case to produce axial thrust for marine propulsion, for which further reference may be had to Croisant et al. U.S. Pat. No. 4,223,773 and Croisant U.S. Pat. No. 3,931,783, incorporated herein by reference. Drive gear means 8 in the gear case drives propeller shaft 6. A vertical drive shaft 10 has a beveled drive gear 12 at its bottom end which engages and drives a pair of driven gears 14 and 16 in opposite directions of rotation concentrically about propeller shaft 6. A wrapped spring clutch 18, for example as shown in "Helicopter Freewheel Unit Design Guide", Sikorsky Aircraft, Division of United Technologies Corp., North Main St., Stratford Conn., U.S. Army Air Mobility Research and Development Laboratories, Fort Eusties, Va., USAAMRDL-TR-77-18, October 1977, especially pages 14, 16 and 56, and for further reference Irgens et al. U.S. Pat. No. 2,959,986 and Shimanckas U.S. Pat. No. 3,608,684, is nonrotatably mounted to propeller shaft 6 for engaging driven gear 14 or 16 of drive gear means 8 for driving propeller shaft 6. Wrapped spring clutch 18 is radially expandable to engage driven gear 14 or 16 along an axially extending friction face engagement surface 20 or 22.

Driven gears 14 and 16 are axially spaced along propeller shaft 6. Wrapped spring clutch 18 is disposed radially between propeller shaft 6 and driven gears 14 and 16. Clutch 18 has a first portion 24 engageable with the inner facing surface 20 of first driven gear 14. Clutch 18 has a second portion 26 engageable with the inner facing surface of second driven gear 16. Clutch face portions 24 and 26 are normally spaced from gear surfaces 20 and 22, with clearance therebetween in neutral.

Clutch control means 28 is axially movable between first and second positions for driving propeller shaft 6 in opposite directions of rotation. In a first leftward position of control shaft 28, first portion 24 of the clutch is cammed at 30 into frictional engagement with first driven gear 14 at surface 20, to drive propeller shaft 6 in one direction of rotation. In the second or rightward position of control 28, the second portion 26 of clutch 18 is cammed at 32 into frictional engagement with second driven gear 16 at surface 22, to drive propeller shaft 6 in the opposite direction of rotation.

Clutch control means 28 is axially movable along propeller shaft 6 by shift linkage 34 which is in turn moved by operator controlled stalk 36. Stalk 36 extends downwardly into the gear case and at its bottom end engages a clevis lever arm 40 of a bell crank 42 pivoted at point 44 above the propeller shaft and axially spaced from drive gear means 8. Bell crank 42 has a second forked lever arm 46 with spaced tines loosely engaging a spool-like coupler 48 which is axially slideable along the outside of propeller shaft 6 and which spins between the split tines of forked lever arm 46 when the propeller shaft is driven. Coupler 48 is connected by a pin 50 to an inner axial control shaft 52 axially slideable within propeller shaft 6. Cam 32 is connected by pin 54 to the other end of inner control shaft 52. Pins 50 and 54 extend through respective radial openings 56 and 58 in the propeller shaft and are held in annular recessed grooves respectively in coupler 48 and cam 32 by respective coil springs 60 and 62, which springs may be like those shown in said Croisant et al. patent. Clutch 18 is connected to propeller shaft 6 by splines 63 and radial pins 64 retained by coil spring 66. Cam 30 is a leftward extension of coupler 48. Tapered roller bearings 68 carry axial thrust of the propeller shaft in one direction, and tapered roller bearings 70 carry axial thrust of the propeller shaft in the opposite axial direction. Thrust bearings 68 and 70 support propeller shaft 6 independently of driven gears 14 and 16 and are preloaded against each other for carrying bidirectional thrust. Bevel or pinion gear 12 is thread mounted to the bottom of drive shaft 10, and the upward thrust thereon from clutch 18 is carried by tapered roller bearings 72. Thrust bearings 72 support the beveled drive gear and carries the load along the axis of drive shaft 10 due to the force from the clutch face engagement surface.

In response to downward movement of stalk 36, lever arm 40 moves downwardly and bell crank 42 pivots clockwise about point 44 to move lever arm 46 leftwardly. Coupler 48 has a central section loosely receiving the tines of fork 46, and having larger diameter end sections 74 and 76. Leftward movement of lever arm 46 engages side 74 of the coupler to move coupler 48 axially leftwardly, thus moving cam 30 axially leftwardly along propeller shaft 6 and into engagement with clutch portion 24 to press the latter against driven gear 14 at engagement surface 20, to thus drive propeller shaft 6. Leftward movement of coupler 48 also moves pin 50 leftwardly through opening 56 to thus move inner control shaft 52 leftwardly which moves pin 54 leftwardly which in turn slides cam 32 axially leftwardly along propeller shaft 6 away from engagement with clutch portion 26 such that the latter is not pressed into engagement with the oppositely rotated driven gear 16 at surface 22. Return rightward axial movement of control means 28 is comparable.

Clutch face means 24 and 26 are movable radially into engagement with driven gears 14 and 16 of drive gear means 8. Clutch faces 24 and 26 are disposed radially between propeller shaft 6 and driven gears 14 and 16, and move outwardly away from the propeller shaft to engage the concentric inner facing surfaces 20 and 22 of the driven gears. The clutch means includes control means movable axially along propeller shaft 6 to cause the noted radial movement of clutch faces 24 and 26. The clutch means includes camming surfaces 30 and 32 for translating the axial movement of control means 28 into radial movement of clutch faces 24 and 26. Control means 28 extends along the propeller shaft and axially beyond drive gear means 8. Operator controlled shift linkage means 34 is operatively connected to the control means through coupler 48 axially spaced from drive gear means 8.

First cam 30 is concentric to propeller shaft 6 adjacent first clutch face portion 24 and radially inward of the latter. First cam 30 is connected to inner control shaft 52 by radial pin 50 extending through opening 56 in the propeller shaft to coupler 48 and cam 30. Cam 30 is movable along propeller shaft 6 over a limited range of axial movement defined by the axial width of opening 56. Second cam 32 is concentric to propeller shaft 6 adjacent second clutch face portion 26 and radially inward of the latter. Second cam 32 is connected to inner control shaft 52 by radial pin 54 through opening 58 in the propeller shaft. Cam 32 is movable along the propeller shaft over a limited range of axial movement defined by the axial width of opening 58.

Centering detent means 78 provides a central tactile neutral positon of clutch control means 28 between the noted first and second, left and right positions. Radially biased resilient means 80 extends through an opening 82 in the propeller shaft and bears between inner control shaft 52 and first cam 30. The resilient means such as spring loaded balls are seated in annular grooved slots in cam 30 and inner control shaft 52 and compressed during leftward or rightward axial movement of shaft 52.

What is claimed is:

1. Clutch apparatus for a marine drive lower gear case, comprising:
    a propeller shaft rotatably mounted in said lower gear case to produce axial thrust;
    drive gear means in said lower gear case for driving said propeller shaft;
    clutch means connected to said propeller shaft and movable to engage said drive gear means along an axially extending friction face engagement surface for driving said propeller shaft;
    wherein said clutch means includes clutch face means movable radially into engagement with said drive gear means;
    wherein said drive gear means includes rotatable driven gear means concentric with said propeller shaft, and wherein said clutch face means is between said propeller shaft and said driven gear means and is radially movable outwardly away from said propeller shaft to engage the concentric inner facing surface of said driven gear means.

2. The invention according to claim 1 wherein said clutch means includes control means movable axially along said propeller shaft to cause said radial movement of said clutch face means.

3. The invention according to claim 2 wherein said clutch means includes camming surfaces for translating said axial movement of said control means into radial movement of said clutch face means.

4. The invention according to claim 3 wherein said clutch face means comprises a wrapped spring clutch.

5. The invention according to claim 2 wherein said control means extends axially along said propeller shaft and axially beyond said drive gear means, and comprising operator controlled shift linkage means in said lower gear case operatively connected to said control means through coupling means at a portion axially spaced from said drive gear means, to axially move said control means.

6. The invention according to claim 2 wherein:
    said driven gear means comprises a pair of oppositely rotatable driven gears concentric with and axially spaced along said propeller shaft;
    said clutch face means includes a first portion engageable with the first driven gear of said pair, and a second portion engageable with the second driven gear of said pair;
    said control means is axially movable between first and second positions for driving said propeller shaft in opposite directions of rotation, said first position of said control means causing said first portion of said clutch face means to engage said first driven gear to drive said propeller shaft in one direction of rotation, said second position of said control means causing said second portion of said clutch face means to engage said second driven gear to drive said propeller shaft in the opposite direction of rotation.

7. The invention according to claim 6 wherein said control means comprises:
    an inner shaft axially slideable within said propeller shaft;
    first cam means concentric to said propeller shaft adjacent said first portion of said clutch face means and radially inward of the latter, said first cam means being connected to said inner shaft by a radial pin through an opening in said propeller shaft and movable along said shaft over a limited range of axial movement; and
    second cam means concentric to said propeller shaft adjacent said second portion of said clutch face means and radially inward of the latter, said second cam means being connected to said inner shaft by a second radial pin through a second opening in said propeller shaft and movable along said shaft over a limited range of axial movement.

8. The invention according to claim 7 wherein:
    said first cam means includes a camming portion radially aligned with said first driven gear and first portion of said clutch face means;
    said first cam means includes a coupling portion extending axially along said propeller shaft to be axially offset and spaced from said first driven gear means and first portion of said clutch face means;
    and comprising operator controlled shift linkage means in said lower gear case operatively connected to said coupling means to axially move said control means.

9. The invention according to claim 8 comprising centering detent means providing a central tactile neutral position of said control means between said first and second positions.

10. The invention according to claim 9 wherein said centering detent means comprises radially biased resilient means extending through an opening in said propeller shaft and bearing between said inner shaft and said first cam means.

11. The invention according to claim 2 comprising first and second axial thrust bearing means supporting said propeller shaft independently of said driven gear means and preloaded against each other for carrying bidirectional thrust.

12. The invention according to claim 11 wherein:

said drive gear means includes a beveled drive gear rotatable about an axis orthogonal to said propeller shaft;

and comprising thrust bearing means supporting said beveled drive gear and carrying the load along said orthogonal axis due to the force from said clutch face engagement surface.

13. Clutch apparatus for a marine drive lower gear case, comprising:

a propeller shaft rotatably mounted in said lower gear case to produce axial thrust;

drive gear means in said lower gear case for driving said propeller shaft;

a wrapped spring clutch mounted to said propeller shaft for engaging said drive gear means for driving said propeller shaft, wherein:

said wrapped spring clutch is radially expandable to engage said drive gear means along an axially extending friction face engagement surface;

said drive gear means comprises a pair of oppositely rotatable driven gears concentric with and axially spaced along said propeller shaft;

said wrapped spring clutch is radially between said propeller shaft and said driven gears;

said wrapped spring clutch has a first portion engageable with the inner facing surface of said first driven gear of said pair;

said wrapped spring clutch has a second portion engageable with the inner facing surface of the second driven gear of said pair;

and comprising control means axially movable between first and second positions for driving said propeller shaft in opposite directions of rotation, said first position of said control means camming said first portion of said wrapped spring clutch into frictional engagement with said first driven gear to drive said propeller shaft in one direction of rotation, said second position of said control means camming said second portion of said wrapped spring clutch into engagement with said second driven gear to drive said propeller shaft in the opposite direction of rotation.

* * * * *